US009022363B2

(12) United States Patent
Nagata et al.

(10) Patent No.: US 9,022,363 B2
(45) Date of Patent: May 5, 2015

(54) PLUGS FOR CARBURETORS

(75) Inventors: Noriyu Nagata, Miyagi-Pref (JP); Hidenori Sasaki, Miyagi-Pref (JP); Daisuke Sato, Miyagi-Pref (JP)

(73) Assignee: Walbro Engine Management, L.L.C., Tucson, AZ (US)

( * ) Notice: Subject to any disclaimer, the term of this patent is extended or adjusted under 35 U.S.C. 154(b) by 258 days.

(21) Appl. No.: 13/551,056

(22) Filed: Jul. 17, 2012

(65) Prior Publication Data

US 2014/0021642 A1 Jan. 23, 2014

(51) Int. Cl.

*B01D 47/02* (2006.01)
*F02M 19/06* (2006.01)
*B21D 53/84* (2006.01)

(52) U.S. Cl.

CPC ........... *F02M 19/06* (2013.01); *Y10T 29/49938* (2015.01); *B21D 53/84* (2013.01)

(58) Field of Classification Search

CPC ......... F02B 63/02; F02B 63/00; Y02T 10/10; Y02T 10/32; F01M 1/00; F01M 9/00; F01M 17/08; F01M 17/10; F01M 2700/4345
USPC ....................................................... 261/119.2
See application file for complete search history.

(56) References Cited

U.S. PATENT DOCUMENTS

| | | | | | |
|---|---|---|---|---|---|
| 2,574,109 | A | * | 11/1951 | Kane, Jr. et al. | 92/206 |
| 2,667,155 | A | * | 1/1954 | Paluch et al. | 123/189 |
| 3,170,005 | A | * | 2/1965 | Phillips | 261/35 |
| 3,256,869 | A | * | 6/1966 | Nutten et al. | 123/73 R |
| 3,498,279 | A | * | 3/1970 | Seeley, Jr. | 123/549 |
| 3,572,297 | A | * | 3/1971 | Murray | 123/1 A |
| RE31,233 | E | * | 5/1983 | Nutten et al. | 123/330 |
| 4,481,930 | A | * | 11/1984 | Chadwick | 123/495 |
| 4,679,824 | A | * | 7/1987 | Rodriguez et al. | 285/27 |
| 5,753,148 | A | * | 5/1998 | King et al. | 261/71 |
| 6,102,449 | A | * | 8/2000 | Welsh | 285/342 |
| 7,070,173 | B2 | * | 7/2006 | Dow et al. | 261/44.6 |
| 2002/0134347 | A1 | * | 9/2002 | Artioli | 123/297 |

* cited by examiner

*Primary Examiner* — Amber Orlando
(74) *Attorney, Agent, or Firm* — Reising Ethington P.C.

(57) ABSTRACT

In accordance with one implementation, a carburetor includes a body having a fluid passage formed therein and a counterbore located along the fluid passage. The counterbore has a first sealing surface and a central axis, and the body further includes a second sealing surface located radially closer to the central axis than is the first sealing surface. The carburetor also includes a plug affixed to the body at the counterbore and in contact with both of the first and second sealing surfaces. Engagement of the plug with the two sealing surfaces may improve the connection between the plug and carburetor body. In at least some implementations, the plug may be held in place without aid of an adhesive or other secondary connector or connection aid.

19 Claims, 3 Drawing Sheets

PLUGS FOR CARBURETORS

TECHNICAL FIELD

The present disclosure relates generally to carburetors and, more particularly, to plugs for closing carburetor openings.

BACKGROUND

Carburetors are devices that can be used to mix fuel with air to power combustion engines. A carburetor may include multiple fluid passages to accommodate fluid flow therein. Certain manufacturing methods such as casting processes or cross-drilling can be used to form parts of one or more of such fluid passages and may temporarily result in a passage being connected to an unintended area, such as a different fluid passage or the environment outside of the carburetor. A plug may be used to close-off or seal openings that would otherwise connect fluid passages to such areas.

SUMMARY

In accordance with one implementation, a carburetor includes a body having a fluid passage formed therein and a counterbore located along the fluid passage. The counterbore has a first sealing surface and a central axis, and the body further includes a second sealing surface located radially closer to the central axis than is the first sealing surface. The carburetor also includes a plug affixed to the body at the counterbore and in contact with both of the first and second sealing surfaces. Engagement of the plug with the two sealing surfaces may improve the connection between the plug and carburetor body. In at least some implementations, the plug may be held in place without aid of an adhesive or other secondary connector or connection aid.

According to another implementation, a carburetor includes a body having an outer surface, a fluid passage surface, and a stepped surface connecting the fluid passage surface with the outer surface. The stepped surface includes an inside corner and an outside corner. The carburetor also includes a plug affixed to the body at the stepped surface and in contact with at least the outside corner of the stepped surface.

In another implementation, a method of forming a portion of a carburetor fluid passage comprises the steps of: placing a plug in a counterbore formed in a carburetor body so that a first side of the plug is in contact with a shoulder of the counterbore; and applying a load to an opposite second side of the plug sufficient to expand the plug and to move a portion of said first side axially beyond the shoulder.

BRIEF DESCRIPTION OF THE DRAWINGS

The following detailed description of preferred embodiments and best mode will be set forth with reference to the accompanying drawings, in which.

DETAILED DESCRIPTION OF PRESENTLY PREFERRED EMBODIMENTS

Figure 1:
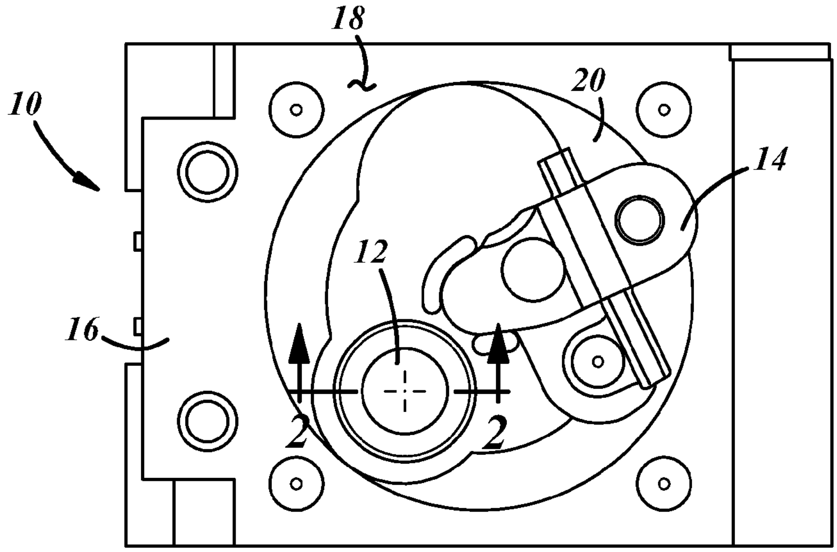
FIG. 1 is a plan view of a portion of a carburetor including a plug installed in a counterbore formed in a carburetor body, according to one embodiment.

FIG. 1 is a plan view of a portion of a carburetor 10 that includes one implementation of a plug 12. The illustrated carburetor 10 includes a metering system 14 and is shown with some components removed. The particular portion of the carburetor 10 shown here includes a carburetor body 16 with an outer surface 18. A recess 20 having a generally round perimeter and formed in the outer surface 18 is part of a metering chamber formed between a metering diaphragm (not shown) and the carburetor body 16 when the diaphragm is placed over the recess 20. The plug 12 is affixed to the carburetor body 16 covering an underlying fluid passage formed therein (not visible in FIG. 1). The particular fluid passage shown in the subsequent figures is an idle fuel pocket, but other types of fluid passages can be configured to accommodate a plug 12 according to the teachings presented herein.

Figure 2:
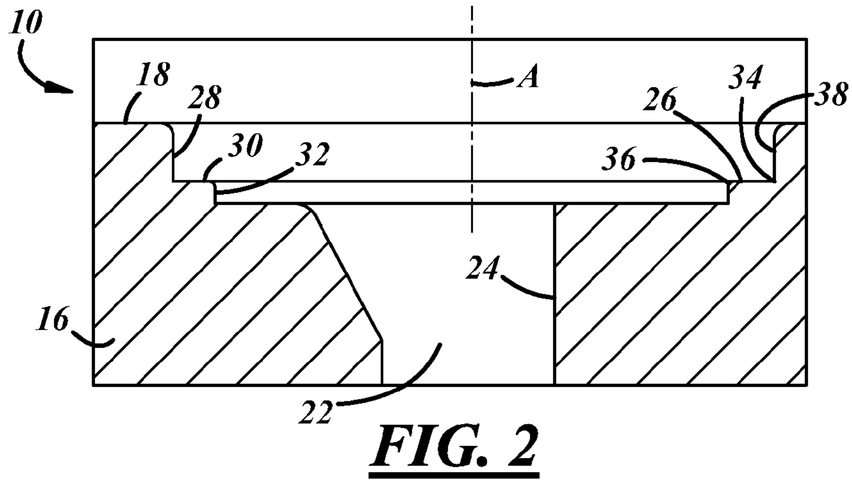
FIG. 2 is a cross-sectional view of the counterbore of FIG. 1, shown without the plug.

FIG. 2 is a cross-sectional view of the carburetor 10 of FIG. 1 taken through the idle fuel pocket 22 prior to installation of the plug. The carburetor body 16 includes a fluid passage surface 24 that partly defines the idle pocket 22, and a stepped surface 26 connecting the fluid passage surface 24 with the outer surface 18, in this embodiment. The stepped surface 26 includes a first sealing surface 28, a shoulder 30, and a second sealing surface 32. The shoulder 30 is located along the stepped surface 26 between the first and second sealing surfaces 28, 32. Each of the first and second sealing surfaces 28, 32 in this implementation is a generally cylindrical surface that extends axially with respect to a central axis A.

The first sealing surface 28 extends axially between the outer surface 18 and the shoulder 30, and the second sealing surface 32 extends axially between the shoulder 30 and the fluid passage surface 24. As shown, at least a portion of the second sealing surface 32 is spaced axially from the first sealing surface 28, although these surfaces could partially axially overlap. In at least some implementations, the majority (more than halt) of the second sealing surface 32 is spaced axially from the first sealing surface 28. The second sealing surface 32 is spaced radially inwardly of the first sealing surface 28 so that it is radially closer to the central axis than is the first sealing surface, with the shoulder 30 extending radially between the sealing surfaces 28, 32 as an annular surface in this implementation. The shoulder 30 and each sealing surface 28, 32 may also be circumferentially continuous and located radially outwardly of the fluid passage as shown.

FIG. 2 illustrates only one example of the stepped surface 26. For example, one or both of the sealing surface(s) 28, 32 and/or the shoulder 30 could be frustoconical or otherwise non-orthogonal with respect to the central axis or could be curvilinear in cross-section. The stepped surface 26 could also include additional sealing surfaces and or shoulders as well, or some portion of the stepped surface may include texture, ridges, valleys, or other surface features.

The stepped surface 26 can also include any number of inside and outside corners, such as inside corner 34 and outside corner 36. Each corner 34, 36 is located at an intersection between surface portions of the stepped surface 26 where the intersecting surface portions lie in different planes. In this example, the inside corner 34 is located at the intersection of the first sealing surface 28 and the shoulder 30, and the outside corner 36 is located at the intersection of the shoulder 30 and the second sealing surface 32. Accordingly, the first sealing surface 28 extends between the outer surface 18 of the body 16 and the inside corner 34, the shoulder 30 extends between the inside and outside corners 34, 36, and the second sealing surface 32 extends between the outside corner 36 and the fluid passage surface 24. Corners 34, 36 can be, but are not necessarily, 90° surface transitions. An inside corner 34 is defined where the angle formed between intersecting surface portions is greater than 0° and less than 180°, and an outside corner 36 is defined where the angle between intersecting surface portions is greater than 180° and less than 360°. The corners 34, 36 are not necessarily sharp corners and may be rounded and/or beveled.

The first sealing surface 28 and the shoulder 30, together with inside corner 34, define a counterbore 38 located along the fluid passage 22 that shares the central axis A. The counterbore 38 is formed in the outer surface 18 of the body, so that the stepped surface 26 includes at least a portion of the counterbore. The counterbore 38 surrounds the second sealing surface 32 in this implementation. The second sealing surface 32 in this example is also considered to be spaced radially inwardly of and axially offset from the first sealing surface 28. These multiple sealing surfaces can be effective to improve connection of the plug to the carburetor body and performance of the plug over other plugs that rely only on contact with the perimeter of the plug.

Figure 3:
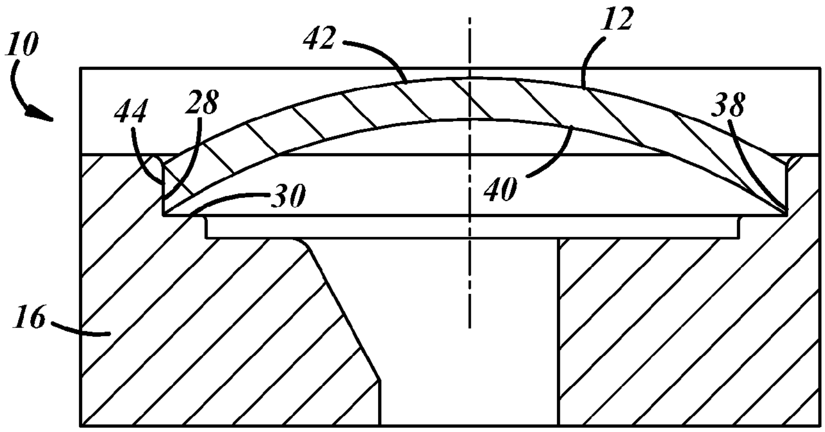
FIG. 3 is the cross-sectional view of FIG. 2, showing the plug located in the counterbore prior to installation.

FIG. 3 shows the plug 12 in place at the counterbore 38 prior to being fully installed in or on the carburetor body 16. In this instance, the plug 12 is an expansion plug with a concave first side 40 facing toward the body 16 and a convex second side 42 that faces away from the body. An expansion plug is a plug that expands in at least one direction during installation to form a frictional fit with the component in which it is installed. In this implementation, which may be referred to as a Welch plug, the perimeter of the plug expands during installation. The plug 12 also includes an outer edge 44 extending between the opposite sides 40, 42 at the perimeter of the plug. In this example, the outer edge 44 lies radially inward of the first sealing surface 28 when the plug is placed in the counterbore 38.

Figure 4:
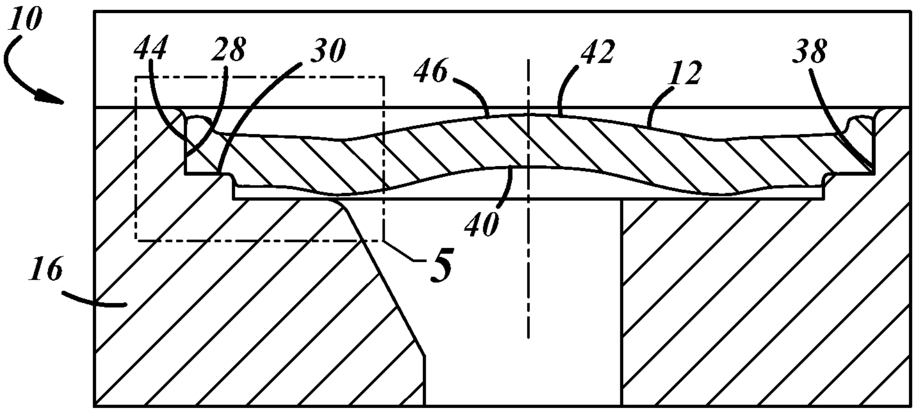
FIG. 4 is the cross-sectional view of FIG. 3, showing the plug after installation.
Figure 5:
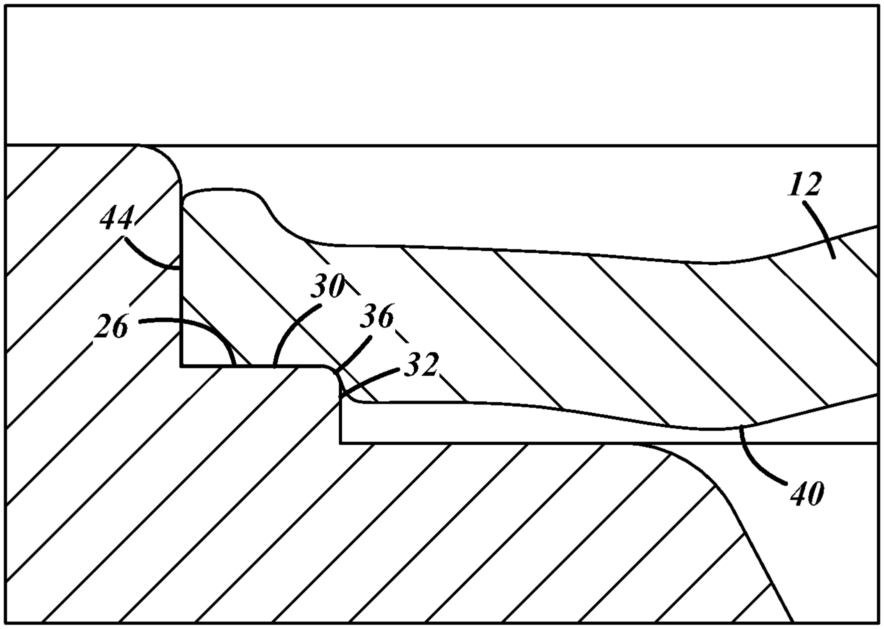
FIG. 5 is an enlarged view of a portion of FIG. 4, showing the plug in contact with sealing surfaces.

FIGS. 4 and 5 show the plug 12 after installation in the carburetor body 16. The plug 12 is affixed to the body 16 at the counterbore 38, which is part of the stepped surface 26, and is in contact with both of the first and second sealing surfaces 28, 32. In this example, the plug 12 is also in contact with the shoulder 30 and the outside corner 36 of the stepped surface 26. In one implementation, the plug 12 is in contact with at least the outside corner 36 of the stepped surface 26. Here, the plug 12 has been deformed so that it is somewhat flattened compared to its original shape of FIG. 3. In particular, a center region 46 is located closer to the carburetor body 16 after a force is applied at the second side 42 of the plug 12. This change in shape presses the edge 44 of the plug 12 against the first sealing surface 28 and the shoulder 30, resulting in a frictional fit where the edge 44 contacts the first sealing surface 28.

As is best shown in the enlarged view of FIG. 5, a portion of the plug 12 engages the outside corner 36 of the stepped surface 26. The plug 12 may wrap around the corner 36, as shown, so that the first side 40 of the plug 12 contacts the second sealing surface 32. A portion of the plug 12 may engage the stepped surface 26 on both opposite sides of the outside corner 36. Also, a portion of the first side 40 of the plug 12 may extend through a plane defined by the shoulder 30 when the plug engages the outside corner 36. In the particular embodiment shown in FIGS. 4 and 5, a portion of the first side 40 of the plug 12 is in surface contact with the shoulder 30, which can also be considered a sealing surface. Thus the amount of surface area of the plug 12 in contact with the carburetor body 16 may be substantially increased over plug configurations that rely only on the edge of the plug as a seal. In the illustrated embodiment, the amount of surface area of the plug 12 that is in contact with the carburetor body 16 is more than double the surface area of only the edge 44 of the plug. In at least some implementations, an amount of plug surface area $A_P$ in contact with the carburetor body of $A_P \geq 3.2dt$ forms a sufficient seal, where d is the plug diameter and t is the plug thickness before assembly. A sufficient seal also may be formed when $A_P \geq 5.9dt$. In one implementation, $A_L \geq 3.2dt$, where $A_L$ is an amount of longitudinal surface area of the plug in contact with the carburetor body. As used here, longitudinal surface area $A_L$ includes the area of any surface that forms an angle of 45 degrees or less with the central axis A. In the example of FIGS. 4 and 5, this is the total amount of plug surface area in contact with the carburetor body, exclusive of the surface area of the shoulder 30. In another relationship, an amount of plug surface area $A_P$ in contact with the carburetor body of $A_P \geq 42t^2$ some forms a sufficient seal, as does $A_P \geq 79t^2$. In one implementation, where surface area is limited to longitudinal surface area, $A_L \geq 42t^2$. Of course, other ratios and dimensions may be used.

Certain characteristics of the plug 12 can affect the sealing and/or retention of the plug 12. In one embodiment, the plug 12 is made from a material that is sufficiently deformable so that it can wrap around the outside corner 36 of the stepped surface 26 during a conventional staking operation to contact the second sealing surface 32, where applied forces may range from 50-500 kgf. A low temper grade aluminum alloy is one suitable material, though any sufficiently deformable aluminum alloy or other metal or metal alloy may be used.

Figure 6:
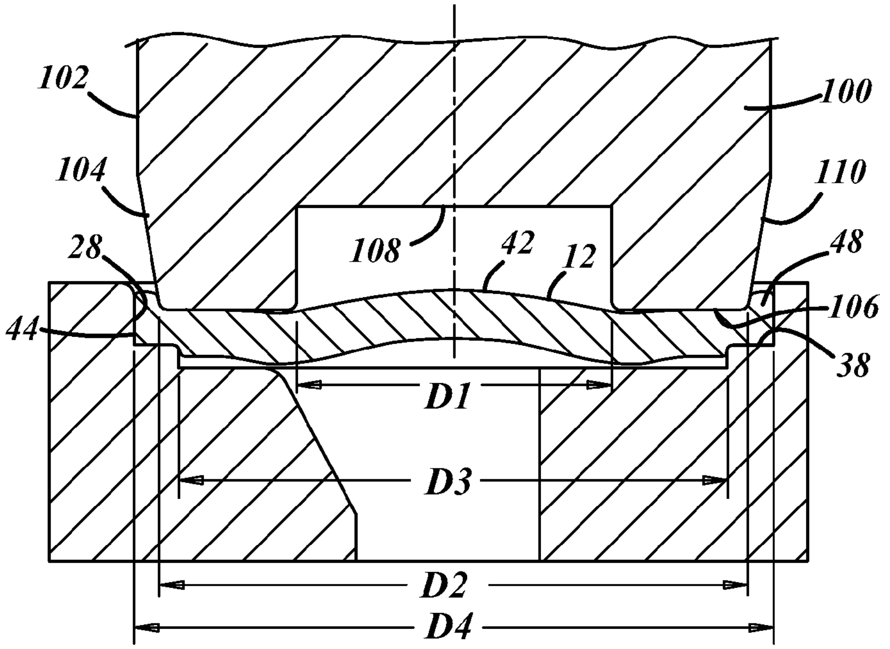
FIG. 6 is a cross-sectional view of FIG. 4, showing one example of a staking tool during a staking operation.

Referring now to FIG. 6, a staking tool 100 is shown in contact with the plug 12 during installation. The illustrative staking tool 100 includes a body 102 with a staking end 104. The staking end 104 includes a contact surface 106 that engages the plug during the staking operation. In the illustrated embodiment, the contact surface 106 is an annular surface with an inside diameter D1 and an outside diameter D2. The outside diameter D2 of the contact surface 106 fits within the first sealing surface 28 and may be larger than an inside diameter D3 of the shoulder 30, as shown. The staking tool 100 also includes a recess 108 formed at the staking end 104 and surrounded by the contact surface 106. The particular recess 108 shown here is sized so that the staking tool 100 does not contact the center of the plug 12 during the staking operation. The recess 108 allows a larger portion of the staking force to be applied toward the perimeter of the staking tool 100 than if the recess 108 was omitted or sized so that the tool 100 contacts the center of the plug 12. This is unconventional, as a typical plug is pressed in the center to promote deformation of the dome shape and the accompanying expansion of the plug diameter.

In one embodiment, the contact surface 106 has an outside diameter D2 that is between 87% and 99% of an outside diameter D4 of the shoulder 34. In another embodiment, the difference between the outside diameter D2 and the outside diameter D4 is between 0.02 mm and 1 mm. In one particular example, the outside diameter D2 is in a range from about 7.0 mm to about 8.0 mm, where the outside diameter D4 of the shoulder is sized for a nominal 8 mm plug 12. A larger diameter contact surface 106 can increase the likelihood that the staking tool 100 will be concentric with the plug 12 during the staking operation. The diameters D1-D4 described here may also be referred to as widths, as not all plugs 12 are necessarily round.

The staking tool 100 may also include a tapered portion 110 at the staking end 104 so that the diameter or width of the staking tool 100 increases with the distance from the contact surface 106. This can be useful to advantageously control any material flow during deformation of the plug. For example, the tapered portion 110 of the staking tool 100 can cause plug material near the edge 44 to be compressed between the tapered portion 110 and the first sealing surface 28 as the plug is deformed, thereby forming an annular lip 48 at the second side 42 of the installed plug 12. Without the tapered portion 110, the annular lip 48 would not necessarily be pressed tightly against the first sealing surface 28. The amount of taper at the tapered portion 110 may vary depending on the depth of the counterbore 38, the relative sizes of the contact surface 106 and the plug 12, the relationships among the various diameters D1-D4, or other factors. In one embodiment, the tapered portion 110 is formed at an angle ranging from 0° to 30° relative to a longitudinal axis of the staking tool. In one particular example, the tapered portion 110 is formed at about a 10° angle relative to the longitudinal axis of the staking tool 100.

An illustrative method of forming a portion of a carburetor fluid passage includes the step of placing the plug in a counterbore formed in the carburetor body so that a first side of the plug is in contact with the shoulder of the counterbore, along with the step of applying a load to an opposite second side of the plug sufficient to expand the plug and to move a portion of the first side of the plug axially beyond the shoulder. The method may include deforming the plug so that a portion of the plug engages the outside corner located the intersection of the shoulder and the second sealing surface. The step of applying the load may be performed with a tapered staking tool; with staking tool shaped so that it does not contact the center of the plug while applying the load; with a staking tool having an annular contact surface with an outside diameter that is larger than an inside diameter of the shoulder and smaller than an outside diameter of the shoulder; or any combination thereof.

Plug and/or staking tool configurations according to one or more of the above-described embodiments may have sufficient sealing and/or retention characteristics without the use of adhesives. In one embodiment, at least one of the first or second sealing surfaces is substantially free of adhesive material. In another embodiment, the stepped surface is substantially free from adhesive material and the plug is substantially free from adhesive material. In other words, no adhesive is necessary for long-term attachment of the plug, though an adhesive material may be optionally used. Reliance on adhesive materials for plug retention and sealing can be problematic, particularly with the advent of higher alcohol-content fuels that tend to degrade some adhesive materials over time. The particular plug illustrated in the figures is in contact with liquid fuel at both sides during carburetor operation, with the metering chamber on one side and the idle pocket on the opposite side, resulting in a particularly harsh environment for adhesive materials.

Figure 7:
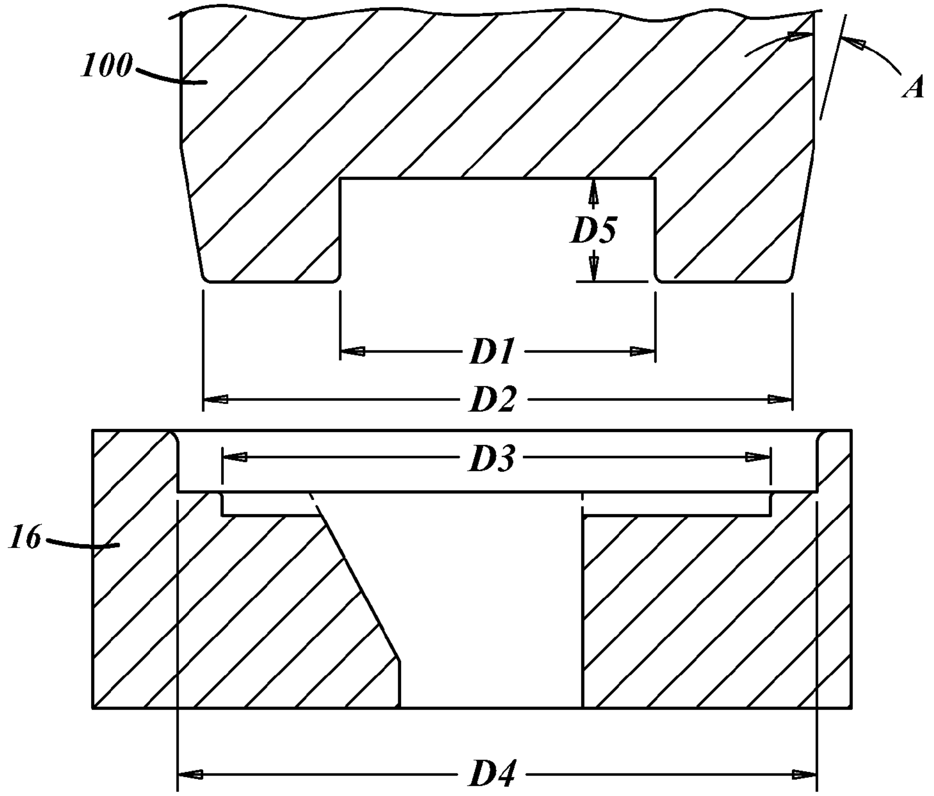
FIG. 7 is a cross-sectional view of a counterbore with dimensions that correspond to experimental data.

TABLE I includes data collected from samples constructed without the outside corner 36 and the second sealing surface 32 from the previous figures so that the shoulder 30 extends further radially inward, as indicated by the dashed line of FIG. 7. The plugs in this case were made from a medium strength aluminum alloy having a thickness of 0.6 mm Referring to FIG. 7: D1=4.0 mm; D2=7.0 mm; D4=8.0 mm; D5=0.15 mm; and A=0 degrees (no taper) for the data in TABLE I. The values given for Pressure Test indicate the amount of air pressure required to remove the plug, and the values given for Force Test indicate the amount of force required to remove the plug. Each value in the table represents an average result taken from multiple samples.

TABLE I

| Staking Force (kgf) | Pressure Test (kg/cm$^2$) | Force Test (kgf) |
|---|---|---|
| 150 | ≤6.0 | 1.9 |
| 250 | ≤6.0 | 2.8 |

TABLE II includes data collected from samples constructed with carburetor bodies as shown in FIG. 2. The plugs here were made from lower temper grade aluminum alloy than the plugs tested for TABLE I. and had a thickness of 0.6 mm With reference to FIG. 7: D1=4.0 mm; D2=7.0 mm; D4=8.0 mm; D5>2.0 mm; and A=20 degrees. Each value in the table represents an average result taken from multiple samples.

TABLE II

| Staking Force (kgf) | Pressure Test (kg/cm$^2$) | Force Test (kgf) |
|---|---|---|
| 150 | >6.0 | 4.7 |
| 250 | >6.0 | 10.6 |

The above data indicates that including the second sealing surface in the carburetor body, using a softer or lower strength material for the plug, and changing certain dimensions of the staking tool can improve plug seal performance and/or retention.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A carburetor, comprising:

a carburetor body having a fluid passage formed therein and a counterbore located along the fluid passage, the counterbore having a central axis, a first circumferentially continuous sealing surface extending generally parallel to the central axis, wherein the body further includes a second circumferentially continuous sealing surface extending generally parallel to the central axis and located radially closer to the central axis than is the first sealing surface; and a deformable metal expansion plug with a first side and a generally axially opposite second side and a circumferentially continuous outer edge, received in the counterbore and deformed to be affixed to the body at the counterbore with the circumferentially continuous outer edge engaged with the first sealing surface and the first side engaged with the second sealing surface.

2. The carburetor of claim 1, wherein at least a portion of the second sealing surface is spaced axially from the first sealing surface.

3. The carburetor of claim 1, wherein the counterbore further comprises a shoulder located between the first and second sealing surfaces and the first side of the plug is in engagement with the shoulder.

4. The carburetor of claim 1, wherein the counterbore further comprises a shoulder located between the first and second sealing surfaces that forms an outside corner at the intersection of the shoulder and the second sealing surface, and a portion of the first side of the plug engages the outside corner.

5. The carburetor of claim 4, wherein the plug is constructed from a material sufficiently deformable to wrap a portion of the first side around the outside corner to engage the second sealing surface during a staking operation where the applied force ranges from 50-500 kgf.

6. The carburetor of claim 1, wherein at least one of the sealing surfaces is substantially free of adhesive material.

7. The carburetor of claim 1, wherein the counterbore further comprises a shoulder located between the first and second sealing surfaces and a portion of the first side of the plug extends through a plane defined by the shoulder.

8. A carburetor, comprising:

a carburetor body having an outer surface, a fluid passage surface, and a stepped surface connecting the fluid passage surface with the outer surface;

the stepped surface includes an inside corner and an outside corner, a first circumferentially continuous sealing surface that extends generally axially between the outer surface of the body and the inside corner, a shoulder that extends generally radially between the inside and outside corners, and a second circumferentially continuous sealing surface that extends generally axially between the outside corner and the fluid passage surface; and a deformable expansion plug with a first side, an opposite second side and a circumferentially continuous outer edge and deformed to be affixed to the body at the stepped surface with the circumferentially continuous outer edge in engagement with the first sealing surface and a portion of the first side in engagement with at least the outside corner of the stepped surface.

9. The carburetor of claim 8, further comprising a counterbore formed in the outer surface of the body, wherein the stepped surface includes at least a portion of the counterbore.

10. The carburetor of claim 8, wherein a portion of the first surface of the plug engages the stepped surface on both opposite sides of the outside corner.

11. The carburetor of claim 8, wherein the plug is in contact with liquid fuel during carburetor operation.

12. The carburetor of claim 8, wherein the stepped surface is substantially free of adhesive material.

13. A method of forming a portion of a carburetor fluid passage, comprising the steps of:

placing a plug in a counterbore formed in a carburetor body so that a first side of the plug is in contact with a shoulder of the counterbore; and with a staking tool shaped so that it does not contact the center of the plug while applying a load, applying a load to an opposite second side of the plug sufficient to expand the plug and to move a portion of said first side axially beyond the shoulder.

14. The method of claim 13, further comprising the step of deforming the plug so that a portion of the plug engages an outside corner located at the intersection of the shoulder and a second sealing surface of the carburetor body.

15. The method of claim 13, wherein the step of applying the load is performed with a staking tool having a contact surface with an outside diameter that is 87% to 99% of the outside diameter of the shoulder.

16. The method of claim 13, wherein the step of applying the load is performed with the staking tool having an annular contact surface with an outside diameter that is larger than an inside diameter of the shoulder and smaller than an outside diameter of the shoulder.

17. The carburetor of claim 1 wherein the area Ap of the plug in contact with the carburetor body is equal to or greater than 3.2 dt where d is the diameter of the plug and t is the thickness of the plug before being deformed into assembly with the carburetor body.

18. The carburetor of claim 8 wherein the area Ap of the plug in contact with the carburetor body is equal to or greater than 3.2 dt where d is the diameter of the plug and t is the thickness of the plug before being deformed into assembly with the carburetor body.

19. The method of claim 13, wherein the area Ap of the plug in contact with the carburetor body is equal to or greater than 3.2 dt where d is the diameter of the plug and t is the thickness of the plug before being deformed into assembly with the carburetor body.

* * * * *